Oct. 15, 1957 D. I. HAYES 2,809,703
TRACK FRAME SUSPENSION FOR ENDLESS TREAD VEHICLE
Filed Jan. 17, 1955 4 Sheets-Sheet 1

INVENTOR.
Dale I. Hayes
BY
Atty.

INVENTOR.
Dale I. Hayes

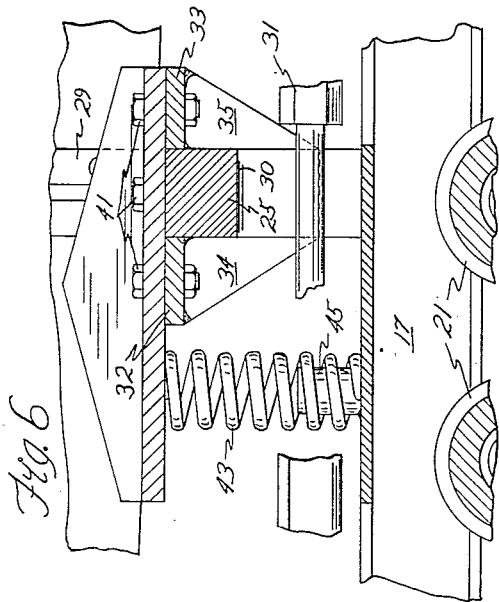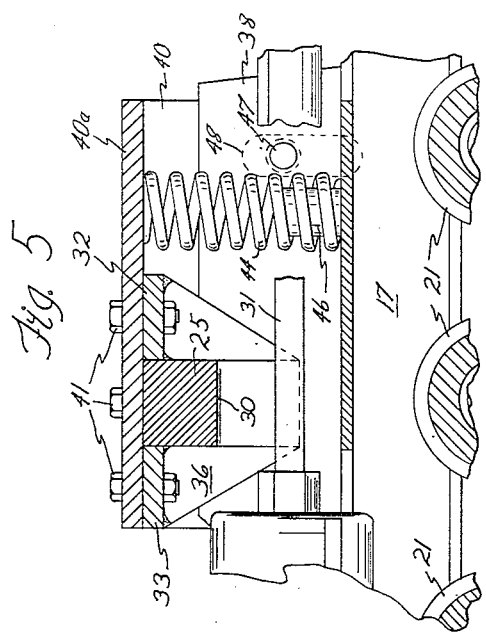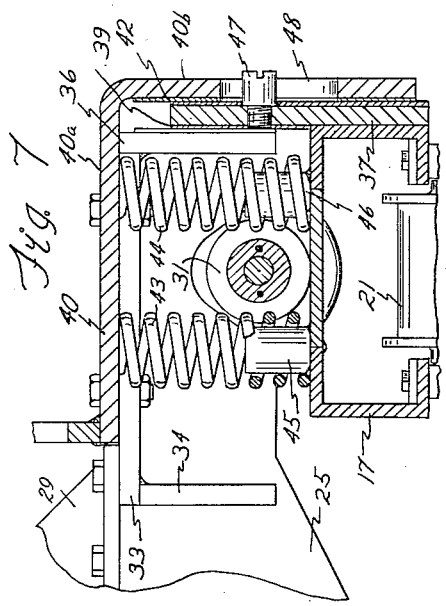

United States Patent Office 2,809,703
Patented Oct. 15, 1957

2,809,703

TRACK FRAME SUSPENSION FOR ENDLESS TREAD VEHICLE

Dale I. Hayes, Spokane, Wash., assignor to American Zinc, Lead and Smelting Company, St. Louis, Mo., a corporation of Maine Application January 17, 1955, Serial No. 482,065

1 Claim. (Cl. 180—9.1)

The present invention relates to improvements in cross beam attachments for crawler type tractors.

In most present day crawler type tractors, the body frame of the machine is flexibly supported between the two truck frames which mount the endless tracks. The drive sprockets for the tracks are mounted at the rear of the truck frames, and are connected to shafts which extend from the drive housing which forms part of the body frame. Thus the body frame is pivoted between the two truck frames at the rear. A common practice is to tie the two truck frames together near the front thereof by a leaf spring, and to support the body frame on that leaf spring. In this way, the shocks transmitted from the tracks are absorbed in the leaf spring, and are not communicated to the body frame. However, it has been found that when the tractor is subjected to particularly rough usage, the leaf spring is not adequate. It invites converging and diverging movement of the front ends of the truck frames causing excessive wear and damage to the machine. To overcome this, rigid connecting means have been employed, comprising a stout beam which extends from one truck frame to the other in place of the leaf spring. When such a device is used, the body frame is supported at the front by the beam. This construction keeps the truck frames properly aligned, but allows every shock encountered to be transmitted to the body frame of the machine. The truck frames are unable to pivot with respect to the body frame or with respect to one another. Whether rigid or leaf spring connections are used, individual up and down pivoting of the truck frames is restricted too much.

In certain applications of a crawler type tractor neither of these methods of supporting the tracks and body frame are satisfactory. When the tractor is used on rough and rocky terrain there is often such a transverse force applied to one or both of the trucks that the leaf spring construction is insufficient to keep them tied together. The rigid beam method of support is not satisfactory because the shocks encountered are not absorbed in any way, and tend to damage the engine and transmission parts. This is especially true when the tractor is used to support another vehicle in front thereof and an additional burden is placed upon it. Such is the case when the tractor is equipped with my coupling device shown and described in my pending application Ser. No. 367,445, filed July 13, 1953, for Coupling Self Loading Transport to Powered Vehicle, and since issued as Patent No. 2,768,006.

It is the principal purpose of my present invention to provide a supporting means for a crawler type tractor which extends between the two truck frames so as to maintain them in proper alignment with the body frame and which will allow each truck frame to pivot vertically with respect to the body frame independently of the other.

My invention utilizes a rigid cross member which is fixed to the body frame and extends outwardly into each track unit near the front thereof. Vertical guide portions are fixed to the cross member at each end. The vertical guide portions cooperate with guide members fixed to the truck frames in the track units and prevent them from moving toward or away from the body frame, and yet allow them to pivot up and down individually with respect to the body frame. Stop means are included on the guides and limit the vertical pivoted movement of the track units. Compression springs positioned between the truck frames and the cross member flexibly support the cross member and the front part of the body frame on the track units.

With this construction, each truck unit is independently mounted to the body frame for limited vertical movement with respect thereto, and is securely held in transverse alignment to the body frame. The compression springs absorb the shocks encountered by each of the track units so that they are not communicated to the body frame.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claim.

In the drawings:

Figure 5 is an enlarged fragmentary sectional view taken on the line 5—5 of Figure 2;

Figure 6 is an enlarged fragmentary sectional view taken on the line 6—6 of Figure 2; and Figure 7 is an enlarged fragmentary sectional view taken on the line 7—7 of Figure 2.

Figure 1:
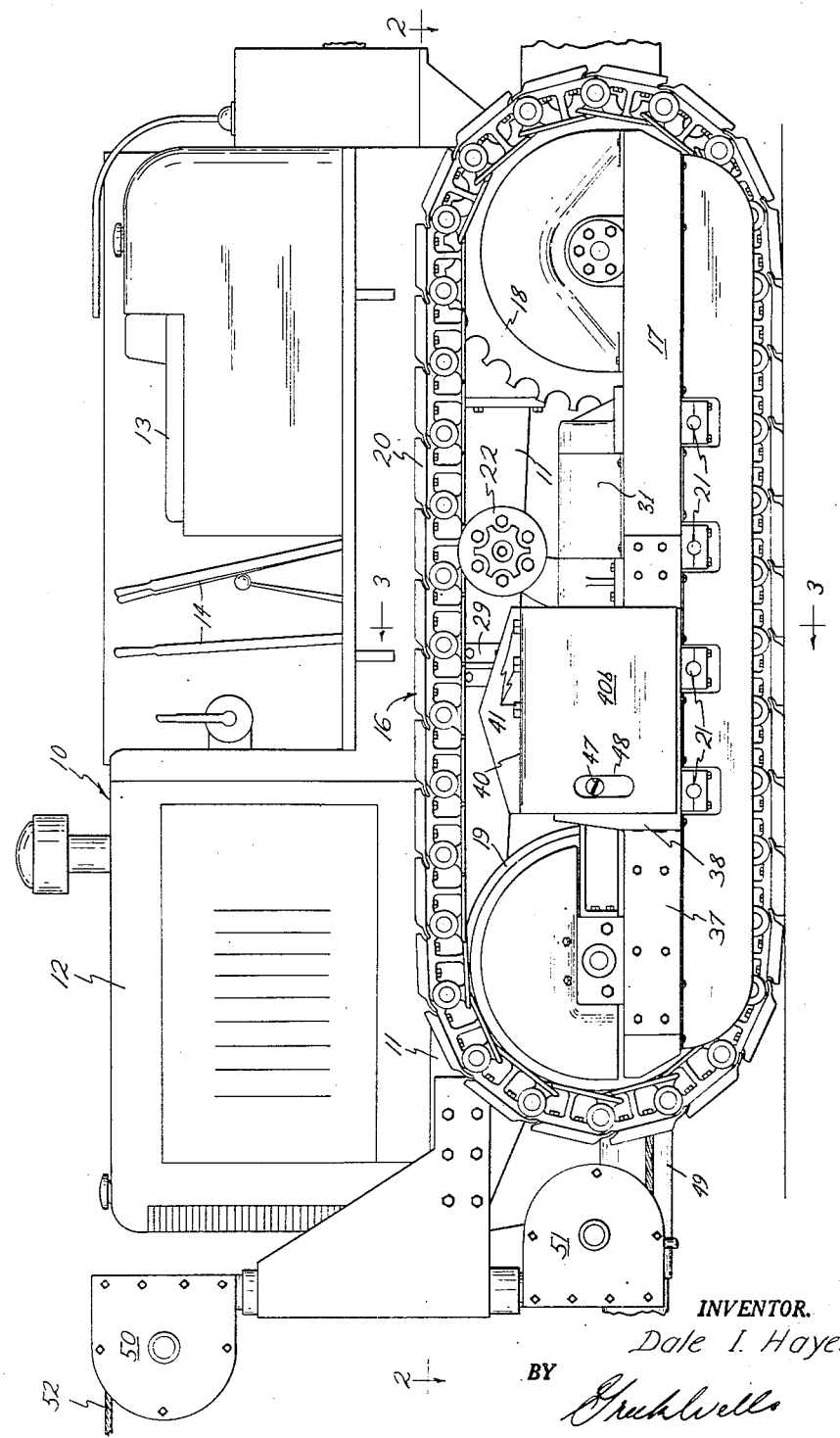
Figure 1 is an elevational view of a crawler type tractor utilizing my invention.
Figure 2:
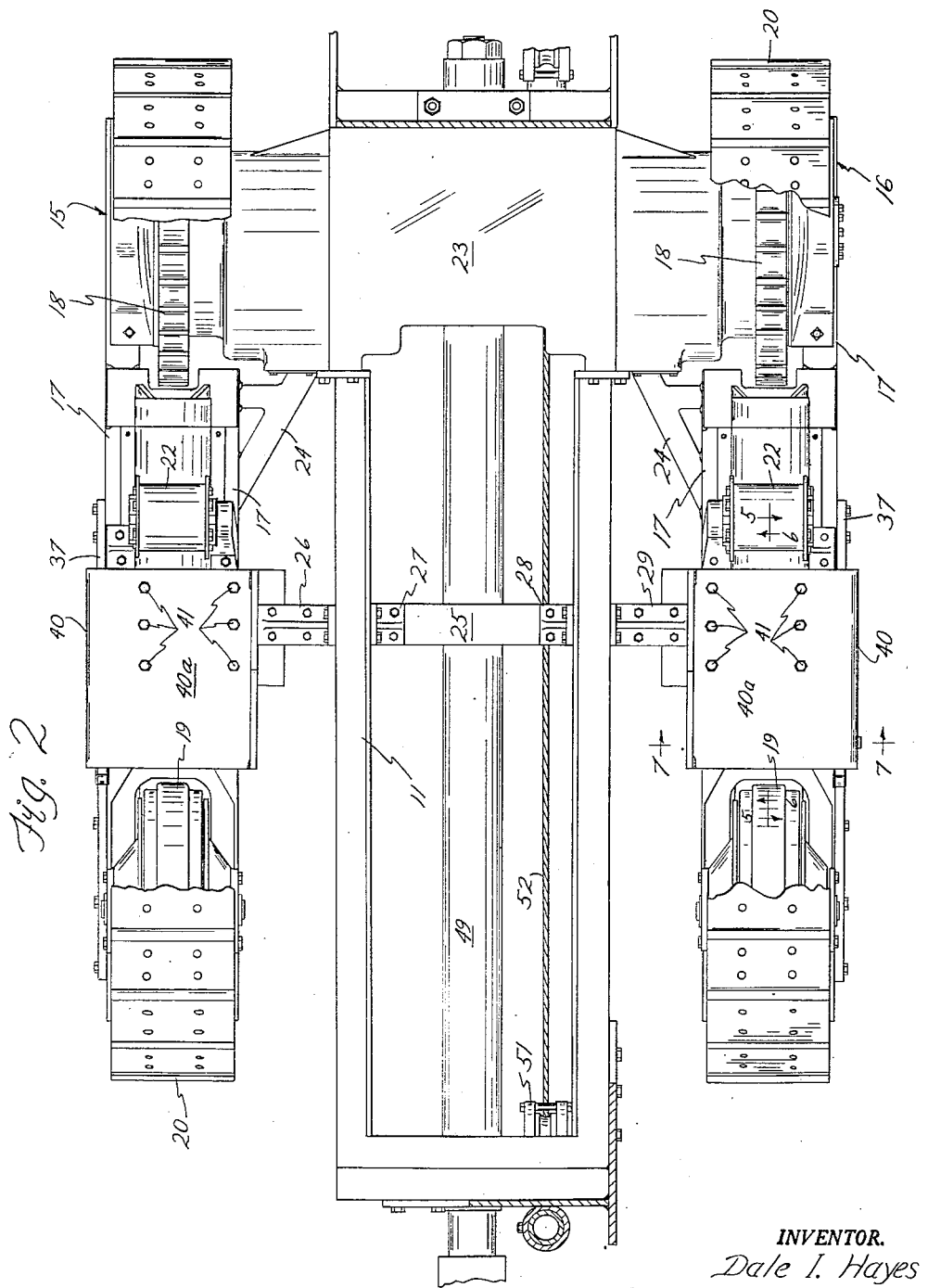
Figure 2 is a plan sectional view of the machine taken substantially on the line 2—2 of Figure 1.

Referring now to the drawings and to Figures 1 and 2 in particular, my invention is shown as applied to a crawler type tractor generally indicated by the numeral 10. The tractor 10 comprises a main body frame 11 which supports a power plant 12, and an operator's compartment comprising a seat 13 and the control devices 14 by which the machine is operated. The body frame 11 is supported by two track units 15 and 16 which are positioned on either side thereof. Each of the track units 15 and 16 comprises a truck frame 17 which supports at the rear end thereof, a drive sprocket 18. An idler wheel 19 is mounted at the front of each truck frame 17, and an endless track member 20 extends around the sprocket 18 and the idler wheel 19. A plurality of truck wheels 21 are mounted on the underside of the truck frame 17, and support the ground engaging flight of the track member 20. An upper track supporting roller 22 is mounted above the truck frame 17 of each unit 15 or 16 to support the upper flight of the track member 20.

The drive sprockets 18 are connected to shafts extending from a drive housing 23 forming part of the body frame 11. The housing 23 surrounds the various power transmission elements that operate to rotate the sprockets 18 and actuate the tracks 20. The truck frames 17 of the track units 15 and 16 have inwardly directed extensions 24 thereon (best shown in Figure 2) which are pivoted to the drive housing 23 on the axis of the sprocket 18. Thus the truck frames 17 are pivotally secured to the housing 23 so that they may rock vertically about the sprockets 18.

The structure hereinbefore described is the standard construction of one of the current models of crawler type tractor and forms no part of this invention. My invention is directed to the means of securing the forward portion of the track units against transverse movement and the means of supporting the forward portion of the body frame 11 on the track units 15 and 16.

Figure 3:
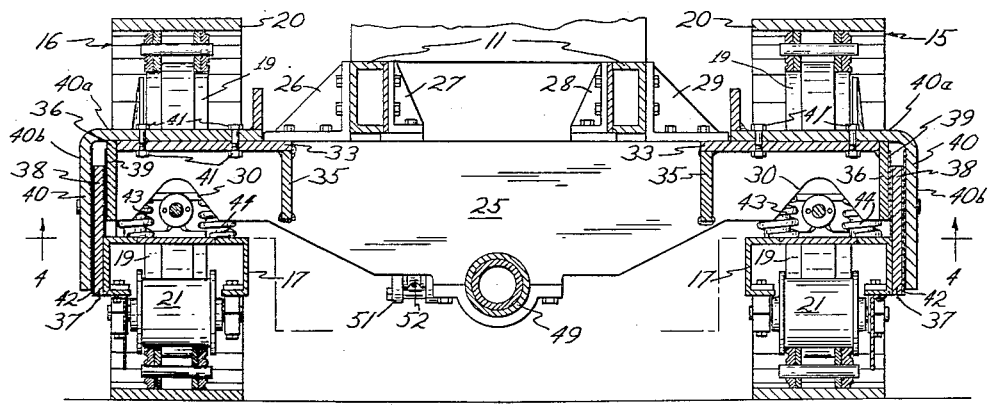
Figure 3 is a vertical sectional view taken on the line 3—3 of Figure 1.
Figure 4:
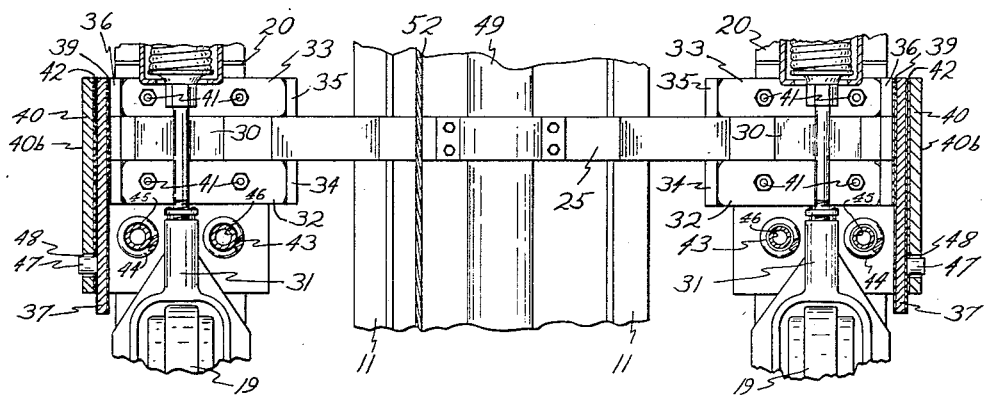
Figure 4 is a fragmentary horizontal sectional view looking up at the cross member looking upward substantially on the line 4—4 of Figure 3.

In order to support the forward portion of the frame 11, a stout cross member 25 is secured thereto. The cross member 25 extends transversely of the frame 11 and outwardly at each side into the track units 15 and 16. The member 25 is secured to the frame 11 by brackets 26, 27, 28 and 29 which are bolted to the top of the cross member 25 and to the frame 11. The outer ends of the cross member 25 are positioned over the truck frames 17 a short distance behind the front idler wheels 19. The cross member 25 has cut out portions 30 near each end thereof to allow clearance for the track tensioning mechanisms indicated at 31 in the drawings. Two horizontal plates 32 and 33 are welded to the opposite sides of each end of the member 25 as shown most clearly in Figures 5 and 6. The plates 32 and 33 are positioned flush with the top of the member 25 so that a wide upper surface is provided. Triangular braces 34 and 35 are fixed to the inner ends of the plates 32 and 33 to maintain them rigidly in place. A flat guide portion in the form of a plate 36 is welded to each end of the cross member 25 and to the plates 32 and 33. A bracing plate 37 is bolted to the outside of each truck frame 17 and has formed thereon an upwardly extending guide member 38. The member 38 extends a considerable distance above the truck frame as shown in Figure 3 and is positioned adjacent the guide plate 36. With this construction, the track units 15 and 16 are held against transverse movement toward the body frame 11 by the coaction of the guides 36 and 38. Wear plates 39 are provided on the adjacent surfaces of the guides 36 and 38 to protect them. The wear plates 39 are merely tack welded to the guides so that they may readily be replaced when necessary.

In order to secure the track units 15 and 16 from transverse movement away from the body frame 11, outer guides 40 are provided on the cross member 25. The guides 40 each have a horizontal part 40a which is positioned above the plates 32 and 33 at the end of the cross member 25. The horizontal part 40a is substantially wider than the surface formed by the plates 32 and 33 and the cross member 25 extends forwardly of these members for a short distance. Bolts 41 secure the part 40a to the plates 32 and 33 and thereby to the member 25. The outer guide 40 has a vertical guide portion 40b thereon which extends down adjacent the outer surface of the guide member 38 on the bracing plate 37. Wear plates 42 are provided on the adjacent surfaces of the guides 38 and 40 to protect them from wear.

In this manner, the truck frames 17 are secured against any sidewise movement with respect to the frame 11. The guide member 38 of the bracing plate 37 fixed to each truck frame is in vertical sliding engagement with the guide plate 36 on the inside, and with the portion 40b of the guide 40 on the outside. Both of the guides 36 and 40 are rigidly secured to the cross member 25 and hence to the frame 11. However, while the construction just described secures the truck frames 17 against sidewise movement, they are free to pivot about the drive sprockets 18, the guide members 38 slipping up or down between the guides 36 and 40.

To support the cross member 25 flexibly above the truck frames 17, spring means are utilized. Two compression springs 43 and 44 are positioned on each of the truck frames 17 in front of the cross member 25. The forwardly extending horizontal portions 40a of the outer guide members 40 rest on the springs 43 and 44 as shown in Figures 5, 6 and 7. The springs 43 and 44 are secured in place by posts 45 and 46 which are fixed to the truck frames 17 and extend up inside the springs 43 and 44. The springs 43 and 44 are of such a size that they support the cross member 25, and the frame 11, a short distance above the truck frames 17. When one of the track units 15 or 16 is forced upwardly when it encounters a rock or other object, it may move upward independently by compressing the springs 43 and 44 thereon. If one of the track units encounters a low spot in the ground, it may drop down by expanding the springs 43 and 44, without jarring the tractor.

It is necessary to limit the pivotal action of the track units, however, to prevent the guides 38 from slipping beyond the bottoms of the guides 36 and 40, when the track units pivot down, and to prevent the truck frames 17 from hammering against the bottom of the cross member 25 when the track units pivot up. To accomplish this, a stop pin 47 is provided on each of the guides 38 and extends through an elongated slot 48 in each of the outer guide portions 40b. This construction is best shown in Figures 1 and 7. The extremities of the slots 48 limit the relative movement of the guides 38 and the guides 40 and thus limit the movement of the track units 15 and 16 with respect to the frame 11.

The construction hereinbefore described is particularly useful on tractors used with my device for coupling self loading transports to powered vehicles hereinbefore referred to. It will be noted that the drawings accompanying this description show the tractor 10 equipped with this device. The numeral 49 refers to the tubular draw bar which forms a part of my coupling mechanism. The numerals 50 and 51 indicate guide sheaves for an operating cable 52 which controls the operation of the transport (not shown). Now, when this coupling mechanism is attached to the tractor 10, it is necessary that the draw bar 49 be rigidly secured to the frame 11. To accomplish this, I have included a drawbar clamp as indicated in Fig. 3 on the cross member 25 which may be utilized to secure the draw bar 49 to the frame 11. With this construction, the cross member 25 supports the weight of the transport as well as that of the tractor body, and the transport as well as the tractor body is relieved of shocks.

My improved cross beam attachment functions very efficiently to support the body frame 11 of the tractor 10 on the truck units 15 and 16. Each of the truck frames 17 in the units 15 and 16 is free for independent limited vertical movement with respect to the body frame 11, but is held in rigid alignment with the body frame 11 by the coaction of the guides 36 and 40 on the cross member 25 and the guide portions 38 of the bracing plates 37 on the truck frames 17. Thus the tractor 10, when equipped with my invention, may be used for the roughest of work without danger of damage.

It is believed that the nature and advantages of my invention will appear clearly from the foregoing description.

Having thus described my invention, I claim:

In a tractor having a body frame, track units including upper and lower runs of endless tread supporting said body frame at each side thereof, each track unit being carried by a longitudinally extending truck frame, and each truck frame being pivoted to the body frame adjacent the rear end thereof, the improvement in supporting said body frame on said truck frames comprising a rigid cross member secured to the body frame and extending transversely thereof over said truck frames and under the upper run of endless tread at each side of the body frame, a horizontal plate secured to each end of the cross member and extending forwardly thereof over the adjacent truck frame, coil springs positioned in front of the cross member being seated against the truck frames and the horizontal plates and supporting the cross member on the truck frames for vertical oscillation, an inner vertical guide plate secured to each end of the cross member, an outer vertical guide plate secured to the horizontal plate and spaced outwardly of the cross member, and an upwardly extending vertical guide member secured to each truck frame and being slidably and frictionally received between said inner and outer guide plates whereby to secure the truck frames from transverse movement with relation to the body frame, and means on the guide plates to limit the vertical oscillation of the truck frames with respect to the cross member comprising a vertically elongated slot in each outer guide plate and a stop pin secured to each upwardly extending guide member being received in said slot.

References Cited in the file of this patent

UNITED STATES PATENTS

| | | |
|---|---|---|
| 1,744,516 | Whiteacre | Jan. 21, 1930 |
| 1,746,001 | Leake | Feb. 4, 1930 |
| 1,815,339 | Turzicky | July 21, 1931 |

FOREIGN PATENTS

| | | |
|---|---|---|
| 502,564 | Belgium | July 18, 1952 |
| | (Corresponding U. S. 2,757,373, July 31, 1956) | |
| 576,597 | Great Britain | Apr. 11, 1946 |